United States Patent Office 2,733,190
Patented Jan. 31, 1956

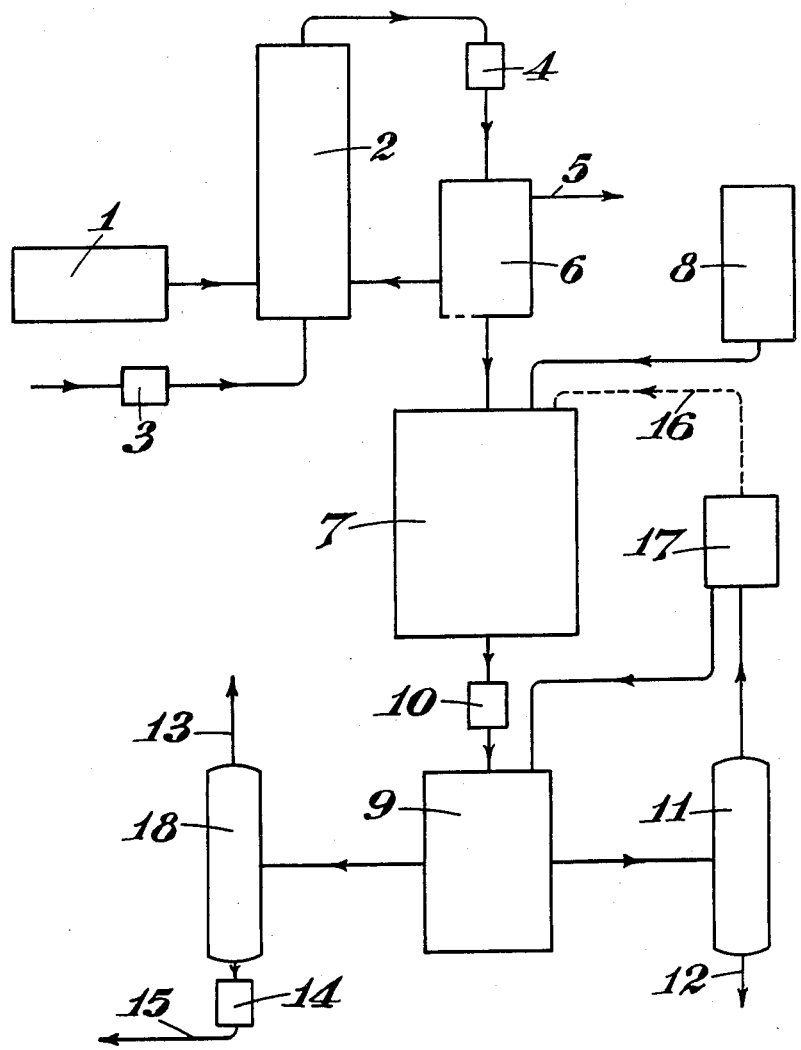

2,733,190
TREATMENT OF SULPHUR-CONTAINING MINERAL OILS

Dennis Alexander John Noble, Sunbury-on-Thames, England, assignor to The British Petroleum Company Limited Application July 2, 1952, Serial No. 296,806

Claims priority, application Great Britain July 4, 1951

14 Claims. (Cl. 196—29)

This invention relates to a new and useful process for the treatment of sulphur-containing mineral oils. More particularly the invention relates to a process for reducing the content of undesirable sulphur compounds in a sulphur-containing mineral oil.

Processes for sweetening or desulphurising mineral oils by oxidation are well known, conventional and widely used processes being the Plumbite and Copper Sweetening Processes wherein mercaptans are oxidised to less objectionable disulphides.

Although it has been stated in the technical literature that organic sulphides react with peroxides, with production of oxidation products such as sulphoxides and sulphones, there has hitherto been no successful application of peroxides as agents for effecting the refining of mineral oils, such as petroleum, for the conversion of undesirable compounds contained therein.

It is an object of this invention to provide a new and useful process for reducing the content of undesirable sulphur compounds in a sulphur-containing mineral oil. Other objects will appear hereinafter.

These objects are accomplished by a process which comprises reacting a sulphur-containing mineral oil with a water-soluble organic peroxy-compound, under conditions such that oxidation products of the sulphur compounds are formed. Preferably a mixture of peroxy-compounds is employed in the form of an aqueous solution.

In general, it has been found desirable to effect the oxidation of the sulphur compounds by said organic peroxy-compounds at a temperature in the range 40° to 100° C. although higher or lower temperatures may be employed according to the nature of the feedstock and other reaction conditions.

If desired the reaction may be carried out with simultaneous air blowing of the reaction mixture.

The process of the invention is improved if steps are taken to bring about intimate contacting of the hydrocarbon phase and the peroxide-containing aqueous phase. This may be accomplished by mechanical dispersion, by the use of chemical dispersing agents or, when methanol is to be used in the extraction stage, by the addition of methanol to the reaction mixture.

It has been found that, in general, by operating according to this process, the oxidation products are produced in a form in which they are readily separable from the treated mineral oil. It is thus a further feature of the present invention that sulphur containing mineral oils are reacted with said water-soluble organic peroxy-compounds and the products of oxidation thereafter removed by physical and/or chemical means. Suitable methods of removal of the oxidation products include acid washing, solvent extraction for example, using methanol, fractional distillation, extractive distillation, adsorption, or a combination of these, or these and other methods.

An aqueous solution containing peroxy-compounds suitable for use in the process of the invention is obtained by the controlled aerial oxidation of hydrocarbons or naturally occurring hydrocarbon-containing materials, such as mineral oil fractions, under conditions such that an oil phase and an aqueous phase is formed, the aqueous phase, comprising the desired peroxy-compounds, being separated. A very suitable peroxide containing material is obtained by the aerial oxidation of a sulphur-free and aromatic-free kerosine at a temperature of about 100° C. to 150° C. It is preferred that the aqueous phase be employed as a desulphurising agent within a short period of time after its formation since, in general, on standing some decomposition of the peroxy-compounds takes place.

In general, a paraffinic feedstock is preferred for the aerial oxidation, a suitable feedstock being obtained by treatment of a paraffin containing material, for example kerosine, with urea to form a solid urea adduct which is separated from the liquid phase and a paraffin enriched fraction recovered by subsequent decomposition of the adduct. Conditions for the separation of hydrocarbons by urea adduction are described by Bengen in German patent application O. Z. 12,438 published in Technical Oil Mission microfilm reel 6, frames 263–70, in copending British patent applications 12,286/50 and 12,287/50 and elsewhere in the technical literature. According to a modification of this method of producing a paraffinic feedstock, thiourea is employed instead of urea. Since thiourea forms adducts with naphthenes and branched chain paraffins but not with normal paraffins, the feedstock to the oxidation stage is in this case derived from the residue from the thiourea-adduction stage.

The process of the present invention is considered to be of particular value for the desulphurisation or partial desulphurisation of petroleum distillation fractions, particularly kerosine and gas oil cuts.

The invention will now be described by way of example with reference to the accompanying flow diagram which illustrates the steps of producing the water soluble peroxides, treating a mineral oil fraction and solvent extracting the product.

A hydrocarbon feedstock, for example, kerosine, is passed, as make-up, from the tank 1 to the oxidizer 2, maintained at a temperature in the range 100°–150° C. Air or oxygen is pumped by the pump 3 and dispersed in the oxidiser 2. The mixture of vapours is condensed in 4 and the condensate passed to 6, where gas (mainly nitrogen, when air is the oxidising gas) is disengaged and removed via the exit line 5. In 6 also, separation takes place between two liquid phases; the upper hydrocarbon layer (which contains an equilibrium concentration of peroxides) is continuously removed and returned to the oxidiser 2, while the lower aqueous layer which contains the desired peroxy-compounds is passed to the reactor 7. In 7, the peroxy-compounds and the oil to be desulphurised from tank 8 are intimately contacted whilst at an elevated temperature. If desired, methanol may also be admitted along line 16 from the methanol tank 17, but in this case it may be necessary to operate the reactor 7 at superatmospheric pressure to prevent evaporation of the methanol. From 7, the liquid mixture which has undergone reaction is cooled in 10 and is extracted in 9 by a countercurrent stream of methanol from tank 17. The effluent methanol extract, containing the methanol-soluble oxidised sulphur compounds and the products of decomposition of the water-soluble peroxy-compounds, is passed to the still 11 where methanol is recovered and returned to the tank 17 and sulphur rich waste oil is removed by line 12. The effluent hydrocarbon stream from 9, which contains dissolved methanol is passed to the evaporator 18, where the methanol vapour is removed by the line 13, is condensed and returned to the methanol tank 17. The oil from the evaporator is cooled in 14 and removed by the exit line 15.

The invention is further illustrated but in no way limited by the following example.

*Example*

A peroxide containing material was prepared by the aerial oxidation of a narrow cut of a sulphur- and aromatic-free kerosine, the narrow cut containing less than 0.024% by weight sulphur and less than 3% by weight aromatics, and boiling in the range 230–235° C.

Three hundred grams of the narrow kerosine cut were charged into a glass vessel and air-blown at 145° C. using a sintered glass diffusing disc at an air flow rate of 70 litres/hour. The effluent air stream was stripped by a series of efficient reflux condensers and the condensed liquid returned to the flask using a Dean and Stark separator. After about 90 minutes, the aqueous oxidate began to settle as the dense phase in the separator and this was run off. Analysis showed 4.77 moles of acid per litre and 3.45 moles of peroxide per litre.

The material treated according to this example was a gas oil of the following characteristics:

| | |
|---|---|
| Specific gravity at 60° F./60° F. | 0.8635 |
| Total sulphur _____ percent wt__ | 1.16 |
| Acidity _____ milligrams KOH/gram__ | 0.09 |
| Cetane number | 53 |
| Mercaptan sulphur _____ percent wt__ | 0.008 |
| Naphthenic acids _____ percent wt__ | 0.034 |
| Nitrogen content | 0.022 |

One hundred grams of the crude gas oil was mixed with 2 millilitres of the aqueous phase and maintained at 100° C. for one hour. The so treated gas oil was extracted with 5 half-volume of methanol and methanol removed from the combined raffinate. The combined raffinate had a sulphur content of 0.86 per cent by weight.

I claim:

1. A process for reducing the sulphur content of a mineral oil, which comprises reacting the mineral oil with an aqueous solution comprising a water-soluble organic peroxy-compound, said solution having been obtained by recovering the aqueous phase of the product obtained by the controlled aerial oxidation of a petroleum dstillate fraction, whereby oxidation products of the sulphur compounds are formed, and separating the treated mineral oil from the oxidation products.

2. A process as specified in claim 1 in which the treated mineral oil is separated from the oxidation products by fractional distillation.

3. A process as specified in claim 1, in which the treated mineral oil is separated from the oxidation products by solvent extraction.

4. A process as specified in claim 1 in which the treated mineral oil is separated from the oxidation products by solvent extraction with methanol.

5. A process as specified in claim 1 in which the mineral oil and aqueous solution are reacted while maintaining intimate contact between the phases.

6. A process as specified in claim 1 in which the mineral oil is treated with the organic peroxy compound at a temperature within the rang 40°–100° C.

7. A process as specified in claim 1 in which the mineral oil is a sulphur-containing petroleum distillate fraction.

8. A process for reducing the sulphur content of a mineral oil, which comprises reacting the mineral oil with an aqueous solution comprising a water-soluble organic peroxy-compound, said solution having been obtained by recovering the aqueous phase of the product obtained by the controlled aerial oxidation of a petroleum distillate fraction, in the presence of methanol while maintaining intimate contact between the phases, whereby oxidation products of the sulphur compounds are formed, and separating the treated mineral oil from the oxidation products by solvent extraction with methanol.

9. A process as specified in claim 1, in which the petroleum distillate fraction is a sulphur-free and aromatic-free kerosine.

10. A process as specified in claim 1 in which the petroleum distillate fraction is a paraffin enriched fraction obtained by treating kerosine with urea to form a solid urea adduct, separating the adduct from the liquid phase and subsequently decomposing the adduct to recover the paraffin enriched fraction.

11. A process for reducing the sulphur content of a mineral oil which comprises subjecting a petroleum distillate fraction to partial aerial oxidation, recovering from the oxidation product an aqueous solution comprising organic peroxide compounds, reacting at least part of said aqueous solution with a sulphur containing mineral oil, whereby oxidation products of sulphur compounds are formed and separating the treated mineral oil from said oxidation products.

12. A process as specified in claim 11 in which the petroleum distillate fraction is a sulphur-free and aromatic-free kerosine.

13. A process as specified in claim 12 in which said kerosine is obtained by treating a paraffin-containing kerosine fraction with urea to form a solid urea adduct, separating the adduct from the liquid phase and subsequently decomposing the adduct to recover a paraffin enriched fraction.

14. A process for reducing the sulphur content of a mineral oil which comprises treating a paraffin-containing material with urea to form a solid urea adduct, separating the adduct from the liquid phase and ubsequently decomposing the adduct to recover a paraffin enriched fraction, subjecting said paraffin enriched fraction to partial aerial oxidation, recovering from the oxidation product an aqueous solution comprising organic peroxide compounds, reacting at least part of said aqueous solution with a sulphur containing mineral oil whereby oxidation products of sulphur compounds are formed and separating the treated mineral oil from said oxidation products.

References Cited in the file of this patent

UNITED STATES PATENTS

| | | |
|---|---|---|
| 1,840,269 | Bergstrom | Jan. 5, 1932 |
| 2,593,761 | Johnstone | Apr. 22, 1952 |
| 2,670,319 | Ayers et al. | Feb. 23, 1954 |

FOREIGN PATENTS

| | | |
|---|---|---|
| 758,567 | France | Nov. 3, 1933 |